US008200369B2

(12) United States Patent
Cheng et al.

(10) Patent No.: US 8,200,369 B2
(45) Date of Patent: Jun. 12, 2012

(54) USE OF STATISTICAL ANALYSIS IN POWER PLANT PERFORMANCE MONITORING

(75) Inventors: Xu Cheng, Pittsburgh, PA (US);
Frederick C. Huff, Pittsburgh, PA (US);
Peter N. Francino, Renfrew, PA (US);
Konrad Swirski, Warsaw (PL)

(73) Assignee: Emerson Process Management Power & Water Solutions, Inc., Pittsburgh, PA (US)

( * ) Notice: Subject to any disclaimer, the term of this patent is extended or adjusted under 35 U.S.C. 154(b) by 210 days.

(21) Appl. No.: 12/047,217

(22) Filed: Mar. 12, 2008

(65) Prior Publication Data
US 2009/0012653 A1 Jan. 8, 2009

Related U.S. Application Data

(60) Provisional application No. 60/894,339, filed on Mar. 12, 2007.

(51) Int. Cl.
*G06F 1/26* (2006.01)
(52) U.S. Cl. .......... 700/287; 700/291; 700/108; 700/95; 700/121; 701/100
(58) Field of Classification Search .................. 700/287, 700/291, 108; 701/100
See application file for complete search history.

(56) References Cited

U.S. PATENT DOCUMENTS

| 2,966,896 | A | 1/1961 | Vogler |
| 3,035,556 | A | 5/1962 | Brunner |
| 3,137,278 | A | 6/1964 | Thayer et al. |
| 4,085,438 | A | 4/1978 | Butler |
| 5,027,751 | A | 7/1991 | Archer et al. |
| 5,181,482 | A | 1/1993 | Labbe et al. |
| 5,440,478 | A | 8/1995 | Fisher et al. |
| 5,764,535 | A | 6/1998 | Okazaki et al. |

(Continued)

FOREIGN PATENT DOCUMENTS
EP 1 313 030 5/2003
(Continued)

OTHER PUBLICATIONS

Heo et al, Development of a Need-Oriented Steam Turbine Cycle Simulation Toolbox, Dec. 2005, IEEE Xplore, vol. 20 Issue 4, pp. 859-869.*

(Continued)

*Primary Examiner* — Albert Decady
*Assistant Examiner* — Olvin Lopez Alvarez
(74) *Attorney, Agent, or Firm* — Marshall, Gerstein & Borun LLP

(57) ABSTRACT

A technique of implementing performance monitoring in a power plant is appropriate to control operating parameters and factors connected with the efficiency of the energy production process in an energy marketplace that is more complex than in the past, and that takes variable costs besides the cost of fuel into account, e.g., environmental credits, equipment degradation and repair costs, electrical energy trade market factors like ramp rate, LMP (Locational Marginal Pricing) factors, the ability to deliver contracted power levels and spot transactions, etc. The technique applies a statistical analysis to collected power plant data to determine the factors that are best controlled or changed to affect (increase) the efficiency or other primary performance indication of the plant, as well as to establish baseline or best-possible operational constraints to be used to control the plant in the future.

38 Claims, 9 Drawing Sheets

U.S. PATENT DOCUMENTS

| | | | |
|---|---|---|---|
| 6,325,025 | B1 | 12/2001 | Perrone |
| 6,368,975 | B1* | 4/2002 | Balasubramhanya et al. .............................. 438/706 |
| 6,490,506 | B1* | 12/2002 | March ........................ 700/286 |
| 6,721,631 | B2* | 4/2004 | Shimizu et al. ............... 700/287 |
| 6,736,089 | B1* | 5/2004 | Lefebvre et al. ............. 122/379 |
| 6,738,931 | B1* | 5/2004 | Osborn et al. .................. 714/37 |
| 6,758,168 | B2 | 7/2004 | Koskinen et al. |
| 6,898,540 | B2* | 5/2005 | Davies ........................... 702/85 |
| 6,980,928 | B1* | 12/2005 | Graichen et al. ............. 702/182 |
| 6,993,403 | B1* | 1/2006 | Dadebo et al. ................ 700/108 |
| 7,065,414 | B2* | 6/2006 | Rogers et al. .................... 700/36 |
| 7,109,446 | B1 | 9/2006 | Cheng et al. |
| 7,206,646 | B2* | 4/2007 | Nixon et al. ..................... 700/83 |
| 7,216,057 | B2* | 5/2007 | Friman et al. ................. 702/182 |
| 7,233,843 | B2* | 6/2007 | Budhraja et al. .............. 700/291 |
| 7,275,025 | B2* | 9/2007 | Chan et al. ......................... 703/7 |
| 7,383,790 | B2 | 6/2008 | Francino et al. |
| 7,526,405 | B2* | 4/2009 | Miller ........................... 702/179 |
| 7,797,062 | B2* | 9/2010 | Discenzo et al. ............... 700/28 |
| 7,862,771 | B2* | 1/2011 | Boyden et al. .................. 422/62 |
| 2001/0034582 | A1* | 10/2001 | Umezawa et al. ............. 702/136 |
| 2002/0077711 | A1* | 6/2002 | Nixon et al. ..................... 700/51 |
| 2003/0088564 | A1 | 5/2003 | Lohmann et al. |
| 2005/0007249 | A1* | 1/2005 | Eryurek et al. ................ 340/511 |
| 2005/0033464 | A1 | 2/2005 | Nguyen |
| 2005/0188745 | A1* | 9/2005 | Staphanos et al. ............ 73/23.31 |
| 2005/0222813 | A1* | 10/2005 | Bjornson ....................... 702/183 |
| 2006/0047607 | A1* | 3/2006 | Boyden et al. ................ 705/400 |
| 2006/0058899 | A1* | 3/2006 | Boyden et al. .................. 700/44 |
| 2006/0073013 | A1* | 4/2006 | Emigholz et al. .............. 416/35 |
| 2006/0089730 | A1* | 4/2006 | Rosenof et al. .................. 700/36 |
| 2006/0106740 | A1* | 5/2006 | Holzbauer et al. ............ 705/412 |
| 2006/0178782 | A1* | 8/2006 | Pechtl et al. .................. 700/286 |
| 2007/0012085 | A1 | 1/2007 | Higashide |
| 2008/0016647 | A1 | 1/2008 | Francino et al. |
| 2008/0082181 | A1* | 4/2008 | Miller et al. ..................... 700/30 |
| 2008/0082194 | A1* | 4/2008 | Samardzija et al. ........... 700/109 |
| 2008/0208429 | A1* | 8/2008 | Saravanapriyan et al. .... 701/100 |
| 2008/0288198 | A1 | 11/2008 | Francino et al. |
| 2011/0046752 | A1* | 2/2011 | Piche .............................. 700/36 |

FOREIGN PATENT DOCUMENTS

| | | |
|---|---|---|
| GB | 2 423 158 | 8/2006 |
| JP | 62-294804 | 12/1987 |
| WO | WO/03019312 * | 3/2003 |

OTHER PUBLICATIONS

Li Pan, Statistical Model for Power Plant Performance Monitoring and Analysis, Sep. 2007, http://ieeexplore.ieee.org/stamp/stamp.jsp?arnumber=04468931, pp. 1-6.*

L. Pan, Sub-Space Principal Component Analysis fro Power Plant Monitoring, Ifac Symposium on Power Plants and Power Sistems, Jun. 2006, pp. 1-6.*

Flynn et al, "Data Mining Techniques Applied to Power Plant performance Monitoring" ,Proceedings of the 16th IFAC World Congress, 2005, pp. 1-6.*

Mevik et al, "Understanding the collinearity problem in regression", 2001, pp. 413-426.*

The MathWorks "Statistics Toolbox for use with Matlab", 2003, pp. 1-101.*

International Search Report and Written Opinion for Application No. PCT/US2008/056699, dated Aug. 28, 2008.

International Search Report and Written Opinion for Application No. PCT/US2008/056741, dated Jul. 11, 2008.

Merle, "La Production Sous Controle Statistique," Mesures Regulation Automatisme, CFE., 687:85-88 (1996).

Search Report for Application No. GB0610955.7, dated Nov. 7, 2006.

European Office Action for Application No. 08743814.9 dated Dec. 14, 2009.

International Preliminary Report on Patentability for Application No. PCT/US2008/056741, dated Sep. 15, 2009.

International Preliminary Report on Patentability for Application No. PCT/US2008/056699, dated Sep. 15, 2009.

Examination Report for GB 0914093.0 dated May 9, 2011.

European Office Action for Application No. 08743814.9 dated Feb. 9, 2011.

Office Action for CN 200880007954.8 mailed Aug. 9, 2011.

\* cited by examiner

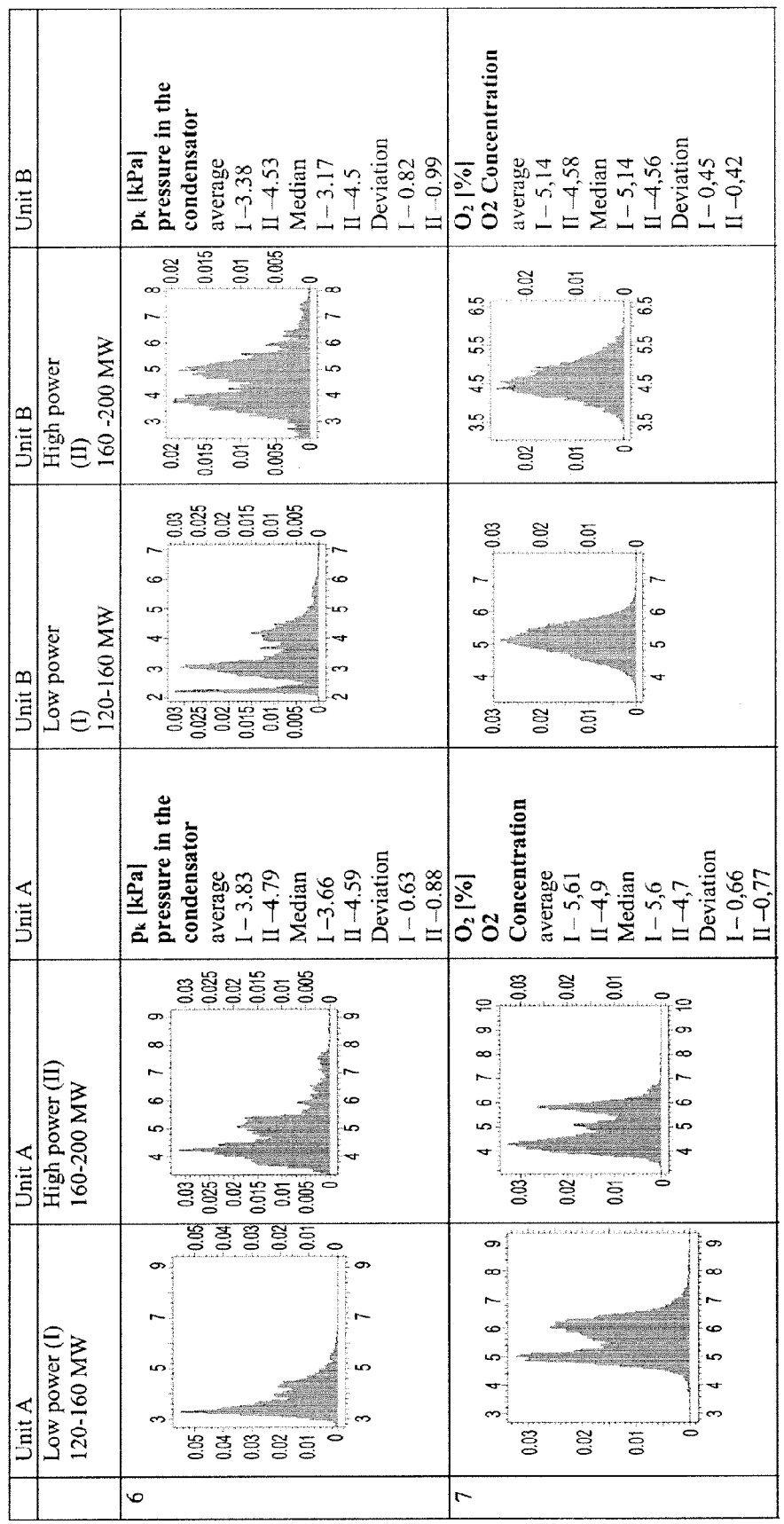

USE OF STATISTICAL ANALYSIS IN POWER PLANT PERFORMANCE MONITORING

RELATED APPLICATIONS

This patent application is a regular filed application that is based on, and claims the benefit of priority to U.S. Provisional Patent Application No. 60/894,339, filed on Mar. 12, 2007, entitled "Statistical Analysis in Power Plant Performance," the entire disclosure of which is hereby expressly incorporated by reference herein.

TECHNICAL FIELD

This patent relates generally to the control and implementation of power generating equipment in power plants, including for example turbine based power plant systems or other steam generating power plant systems.

BACKGROUND

A variety of industrial as well as non-industrial applications use fuel burning boilers which typically operate to convert chemical energy into thermal energy by burning one of various types of fuels, such as coal, gas, oil, waste material, etc. An exemplary use of fuel burning boilers is in thermal power generators, wherein fuel burning boilers generate steam from water traveling through a number of pipes and tubes within the boiler, and the generated steam is then used to operate one or more steam turbines to generate electricity. The output of a thermal power generator is a function of the amount of heat generated in a boiler, wherein the amount of heat is directly determined by the amount of fuel consumed (e.g., burned) per hour, for example.

In many cases, power generating systems include a boiler which has a furnace that burns or otherwise uses fuel to generate heat which, in turn, is transferred to water flowing through pipes or tubes within various sections of the boiler. A typical steam generating system includes a boiler having a superheater section (having one or more sub-sections) in which steam is produced and is then provided to and used within a first, typically high pressure, steam turbine. To increase the efficiency of the system, the steam exiting this first steam turbine may then be reheated in a reheater section of the boiler, which may include one or more subsections, and the reheated steam is then provided to a second, typically lower pressure steam turbine. While the efficiency of a thermal-based power generator is heavily dependent upon the heat transfer efficiency of the particular furnace/boiler combination used to burn the fuel and transfer the heat to the water flowing within the various sections of the boiler, this efficiency is also dependent on the control technique used to control the temperature of the steam in the various sections of the boiler, such as in the superheater section of the boiler and in the reheater section of the boiler.

The steam turbines of a power plant are typically run at different operating levels at different times to produce different amounts of electricity based on energy or load demands. For most power plants using steam boilers, the desired steam temperature setpoints at final superheater and reheater outlets of the boilers, as well as other settings within the system, are kept constant, and it is necessary to maintain steam temperature setpoints as well as other operating parameter setpoints close to a set of preestablished setpoints (e.g., within a narrow range) at all load levels. These setpoints may, in many cases, be set according to the use of manufacturer reference values and correction curves.

As is known, the efficiency of the operation of power plants, including steam generating or turbine power plants, is based on a number of factors within the plant, including not only the operating state of the equipment, but the type of control being applied at any particular time. In past decades, power plants, and especially power plants coupled to and providing power on the public power grid, were generally run at fairly constant outputs, and thus could be optimized over time using various techniques developed by the ASME. At the present time, however, the power (electricity) market is moving to a deregulated market, which allows for, and in fact encourages, constantly changing the amount of power being placed on the power grid by any particular utility or power plant based on market factors. This change in the marketplace leads to a situation in which the power being generated by a particular plant may be typically in flux or changing. This factor, in conjunction with the fact that the market is moving to ISO types of structures, has led to the increased role of computer control and diagnostic systems, which is rendering previous performance methodologies obsolete. In particular, several key aspects within these previous performance methodologies, including the use of manufacturer based reference values and correction curves, may lead to highly imprecise and inadequate evaluation of plant performance, especially considering operational behavior in a dynamic electricity market in which it is very important to be able to quantify plant performance quickly and accurately, to be able to profitably supply power in changing market conditions.

The plant performance methodology that is currently being used to implement performance monitoring in power plants was developed more than 20 or 30 years ago for power units operating with the expected conditions in the power industry. That methodology was developed based on, and corresponded to, the American and Western Europe standards of the 1960s and 70s, which put a premium on reliability (and not necessarily on efficiency). While this methodology, at the time, brought many significant advantages in the form of an improved quality of performance monitoring, it is outdated by the current dynamic deregulation aspects of the power generation industry. This obsolescence is due to a couple of factors, including (1) the advancement of computer technology that allows for common use of digital automatic control systems and (2) system changes in the power energy market. As a result, using this older performance analysis approach becomes less viable as a true performance index of a plant capability.

Generally speaking, the plant performance monitoring methodology that is currently being implemented to measure plant performance is based on calculating the unit chemical energy usage rate (using ASME power test codes) and then assigning measured loss deviations of the unit chemical energy usage rate from the expected value (i.e., a nominal value resulting from the last design or warranty measurements) as a result of operating the unit at parameters other than at the nominal parameters. The basic parameters whose influence over the unit heat rate is usually taken into consideration include main steam pressure, main steam temperatures, pressure decrease in the superheater (SH), reheat steam temperature (RH), pressure in the condenser, temperature of feedwater, and oxygen content in flue gas and flue gas temperature. While the number of these parameters has been extended many times, the theoretical basis of this method has stayed the same, in which the deviation in unit heat rate [kJ/kWh](BTU/kW) is usually calculated to a value of dollars per hour ($/h) for a more visual presentation of data. Systems such as this, which are based on ASME, TKE or similar methodologies, have been introduced in practically all power plants. With the modernization of automatic control systems, these methods have developed into an on-line system which performs all of the performance monitoring calculations, e.g., every several minutes, and presents the results on an operators' display screens at the distributed control system or at auxiliary computer displays to enable the operators to see the loss in efficiency of the plant and cost due to current operating conditions.

While the ASME performance monitoring methodology is effective when properly implemented, it has drawbacks. In particular, it is apparent, after so many years (and after many platform revisions), that there are basic problems with applying the current performance monitoring applications, due in large part to the use of original equipment manufacturer (OEM) provided "reference values" and "correction curves" that define the controlled (i.e., measured) losses from a particular operating point within the power plant. More particularly, in the current performance measuring system, most performance deviations (losses) are calculated (or are monitored) based on deviations from a set of so-called "reference values" which are usually the nominal values given by the OEM manufacturer. However, for devices that often have a 10-20 year life cycle, and that may have been modernized numerous times during their life, the OEM supplied reference values do not constitute a real reflection of the actual, as found parameters, within a particular power plant. Additionally, the present ASME methodology assigns the influence of operational parameter deviation (deviations in temperature, pressure, etc. during plant operation) from the assumed nominal values (i.e., the assumed achievable, design, or theoretical values) using the manufacturer's so-called "correction curves." Leaving aside the accuracy of these correction curves in the first place (as there are common problems with obtaining these correction curves), the basis of this theory relies on defining the influence of deviations in the current operating parameters from the nominal or reference value on the unit heat rate (efficiency).

Unfortunately, the manufacturer's data, in the form of both the reference values and the correction curves, does not necessarily correspond to the real, dynamic operation of a particular maintained unit. Instead, this data is, at best, indicative of the average or assumed steady-state performance of a new unit. There is thus a serious theoretical problem with assigning a deviation for a given control value in a particular plant, which may not operate the same as the new unit for numerous reasons, based on these reference values and curves in the first place. Moreover, when building a correction curve, the manufacturer assumes that it is possible to make a clear assignment of the influence of a given operating parameter value on the unit heat rate without considering any other operating parameter. In other words, it is assumed that operating variables such as pressure, temperature, etc., can be treated as independent variables, which allows the method to apply balance calculations using the correction curves to calculate the effect of a change in an individual parameter on the plant efficiency (unit heat rate). In actual practice, however, a strong interrelationship or interdependence exists between the various plant operating parameters. For example, various operating parameters are known to be highly interrelated in the form of the turbine equation. As a result, while the current performance methodology assumes that it is possible to modify one parameter without changing other parameters, during normal operation of the plant it is not possible to change one parameter without changing a few others. Additionally, the relationships between these parameters is not only dependent on the thermodynamic dependencies (balance), but are also influenced by the operation of the automatic control system that is actually controlling the unit. These relationships are simply ignored in the current methodology. In practice, therefore, when changing one of the main unit operational parameters, the automatic control systems shifts the unit status into a different operating point by also modifying the other parameters.

Because of these factors, deviations assigned using OEM correction curves cease to have any practical significance. For example, if, at a given moment, deviations of a unit heat rate are assigned for a series of main parameters, and a negative deviation for one of the parameters is obtained (resulting from the difference between the current value and the nominal or reference value), and if this difference is cancelled (i.e., the parameter is brought to the nominal or reference value to reduce the deviation), the other parameters will not remain unchanged, even though the performance methodology assumes that the other parameters will remain unchanged. This real life operation results in an entirely different set of parameter values, which will have other differences from the corresponding reference values, resulting in a completely different set of deviations to be corrected.

Still further, there is a problem with applying statistical balance models to assign losses during load following (i.e., dynamic) unit operation using the current ASME performance measurement methodology. In particular, the models used in current performance monitoring methodologies are based on a strictly static approach, i.e., based on the static operation of the plant. As a result, a good thermal status (or quasi-static) isolation of the unit operation is needed to obtain relevant performance monitoring results using these models. In the simplest approach, this static isolation requires a momentary stabilization of unit power and its principal parameters. However, in the power generation conditions associated with the present (ISO or deregulated) market, using a strictly static approach is simply impossible. In fact, the entire theory behind unit operation that actively participates in the power market assumes operation during dynamic (ramping or transitional) states.

Still further, the approach for obtaining good global performance results is to perform diverse processing of static performance data, which averages the results from various sites (considering the normal distribution of calculation errors and influence of dynamic states) thereby canceling momentary error. However, using this methodology for temporary (dynamic) performance monitoring is questionable at best.

SUMMARY

A method of implementing performance monitoring in a power plant described herein is appropriate to control operating parameters and factors connected with the efficiency of the energy production process in an energy marketplace that is more complex than in the past, and that takes into account more than just the cost of fuel. In particular, this method works well when the real costs of production are largely dependent on other variable costs besides the cost of fuel, such as environmental credits (e.g., the cost of NOx, Sox emissions and the future influence of emission trade), equipment degradation and repair costs, as well as electrical energy trade market factors like ramp rate, LMP (Locational Marginal Pricing) factors, and the ability to deliver contracted power levels and spot transactions.

In particular, a power plant performance monitoring technique applies a unique statistical analysis to collected power plant data to determine the factors that are best controlled or changed to affect (increase) the efficiency or other primary performance indication of the plant, in whatever state or operating level the plant is run. Because heat rate calculation applications are typically performed on-line, it is possible to analyze collected plant data in detail and to apply for example, principal component analysis (PCA) and linear and nonlinear regression analysis to the data, which enables the performance method to obtain a more accurate determination of the influence of the principal process parameters that affect heat rate deviation (efficiency), as well as to establish baseline or best-possible operational constraints to be used to control the plant in the future. This performance based control methodology will allow for near optimum performance of power plants by constantly allowing for refinement and best practices and control to be realized.

BRIEF DESCRIPTION OF THE DRAWINGS

FIGS. 3A-3E illustrate a set of histograms developed from collected plant operational data for a primary performance indication and for a number of plant parameters that are related to the primary performance indication during various different operational states of two different power plants.

DETAILED DESCRIPTION

Digital, computer based, automatic control systems now present in many power plants allow for almost constant monitoring and control of plant performance by monitoring all performance parameters (and losses) on-line and by permitting direct operator supervision and oversight. The increase in the quality of measurement devices and tools has also dramatically reduced the role of periodic heat rate testing and warranty measurements. However, the high quality nature of automatic distributed control systems (DCS) connected with common optimization systems (which substitute for operator actions during normal unit operation) has reduced the possibility of obtaining simple improvements in efficiency indexes. For this reason, the principal role of performance supervision can now be modified to that of performing real detection of possible losses associated with running a particular power unit in a market based generation dispatch manner.

To implement this goal, a new method of implementing power plant performance monitoring and control includes collecting and storing statistical data pertaining to the operation of the various units or sub-sections of a power plant, and then performing a statistical analysis on the data to determine which parameters are most highly correlated with one or more performance indications of the plant, such as plant efficiency, unit heat rate, etc. Subsequent control activities may then be implemented within the power plant to control the identified parameters in a manner that provides a high degree of control on the parameters most correlated or responsible for changes in the performance indication, while, if necessary, allowing other parameters to range outside of nominal, suggested or predetermined limits or ranges, so as to provide better (more optimal) plant operation. In this manner, performance monitoring and control is based on the actual operational conditions of a particular power plant for which data is collected, instead of being based on a theoretical or test power plant. Moreover, instead of being limited to using the cost of fuel as the only cost variable in determining the unit heat rate or other efficiency measure, other cost or income variables (factors) can be taken into account in the performance calculations, such as the cost of emissions, equipment repair costs, carbon credits, etc.

Figure 1:
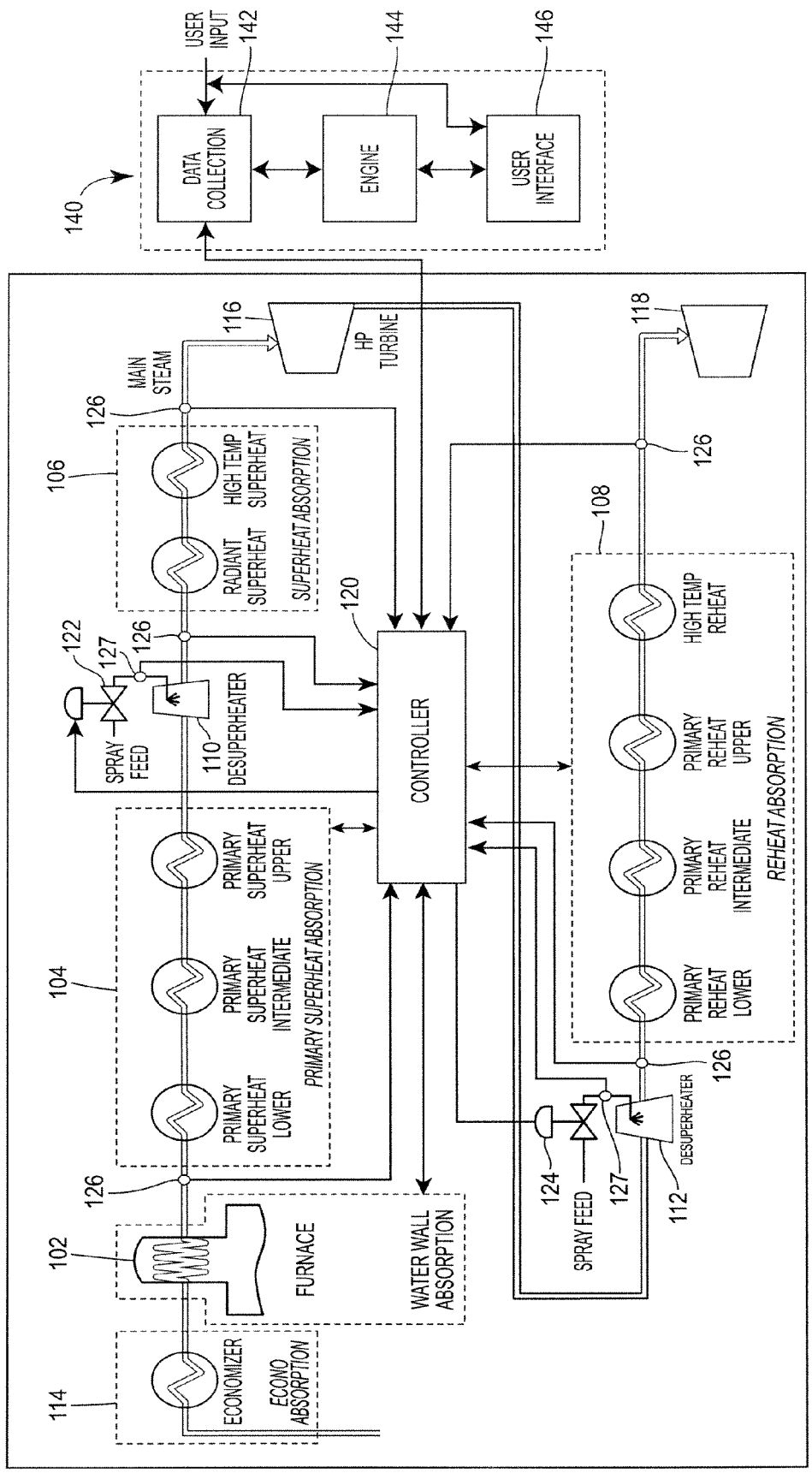
FIG. 1 illustrates a block diagram of a power plant having a typical boiler steam cycle for a set of steam powered turbines.

Before discussing the new performance monitoring methodology, a typical power plant in which this methodology can be implemented will be described in a general manner. FIG. 1 illustrates a block diagram of a once-through boiler steam cycle for a typical boiler 100 that may be used in, for example, a thermal power plant. The boiler 100 may include various sections through which steam or water flows in various forms such as superheated steam, reheated steam, etc. While the boiler 100 illustrated in FIG. 1 has various boiler sections situated horizontally, in an actual implementation, one or more of these sections may be positioned vertically with respect to one another, especially because flue gases heating the steam in various different boiler sections, such as a water wall absorption section, rise vertically (or, spirally vertical).

In any event, as illustrated in FIG. 1, the boiler 100 includes a furnace and a primary water wall absorption section 102, a primary superheater absorption section 104, a superheater absorption section 106 and a reheater section 108. Additionally, the boiler 100 may include one or more desuperheaters or sprayer sections 110 and 112 and an economizer section 114. During operation, the main steam generated by the boiler 100 and output by the superheater section 106 is used to drive a high pressure (HP) turbine 116 and the hot reheated steam coming from the reheater section 108 is used to drive an intermediate pressure (IP) turbine 118. Typically, the boiler 100 may also be used to drive a low pressure (LP) turbine, which is not shown in FIG. 1.

The water wall absorption section 102, which is primarily responsible for generating steam, includes a number of pipes through which water or steam from the economizer section 114 is heated in a furnace. Of course, feedwater coming into the water wall absorption section 102 may be pumped through the economizer section 114 and this water absorbs a large amount of heat when in the water wall absorption section 102. The steam or water provided at output of the water wall absorption section 102 is fed to the primary superheater absorption section 104, and then to the superheater absorption section 106, which together raise the steam temperature to very high levels. The main steam output from the superheater absorption section 106 drives the high pressure turbine 116 to generate electricity.

Once the main steam drives the high pressure turbine 116, the steam is routed to the reheater absorption section 108, and the hot reheated steam output from the reheater absorption section 108 is used to drive the intermediate pressure turbine 118. The spray sections 110 and 112 may be used to control the final steam temperature at the inputs of the turbines 116 and 118 to be at desired setpoints. Finally, the steam from the intermediate pressure turbine 118 may be fed through a low pressure turbine system (not shown here), to a steam condenser (not shown here), where the steam is condensed to a liquid form, and the cycle begins again with various boiler feed pumps pumping the feedwater through a cascade of feedwater heater trains and then an economizer for the next cycle. The economizer section 114 is located in the flow of hot exhaust gases exiting from the boiler and uses the hot gases to transfer additional heat to the feedwater before the feedwater enters the water wall absorption section 102.

As illustrated in FIG. 1, a controller or control system 120 is communicatively coupled to the furnace within the water wall section 102 and to valves 122 and 124 which control the amount of water provided to sprayers in the spray sections 110 and 112. The controller 120 is also coupled to various sensors, including temperature sensors 126 located at the outputs of the water wall section 102, the desuperheater section 110, the second superheater section 106, the desuperheater section 112 and the reheater section 108 as well as flow sensors 127 at the outputs of the valves 122 and 124. The controller 120 also receives other inputs including the firing rate, a signal (typically referred to as a feedforward signal) which is indicative of and a derivative of the load, as well as signals indicative of settings or features of the boiler including, for example, damper settings, burner tilt positions, etc. The controller 120 may generate and send other control signals to the various boiler and furnace sections of the system 100 and may receive other measurements, such as valve positions, measured spray flows, other temperature measurements, etc. While not specifically illustrated as such in FIG. 1, the controller 120 could include separate sections, routines and/or control devices for controlling the superheater and the reheater sections of the boiler system 100.

As illustrated in FIG. 1, a performance monitoring system 140 includes a data collection system 142 that collects data from each of the various devices within the boiler 100 or the power plant pertaining to the values of various parameters within the power plant at any particular time (e.g., the steam and water temperatures, pressures, control signals, etc.). In particular, the data collection system 142, which may include a database and an appropriate interface, is illustrated in FIG. 1 as being connected directly to the controller 120 to receive data from the controller 120 related to the ongoing operation of each of numerous devices within the system 100, such as the devices 102, 104, 124, 126, 127, etc. However, the data collection system 142 could instead or additionally be communicatively connected to any or all of the devices 102, 104, 124, 126, 127, etc. within the plant 100 to receive data about the operating states or conditions of those devices at numerous times during operation of the plant 100. Generally speaking, the data collection system 142 will periodically receive and store data pertaining to the operational conditions or states of the various devices or operating parameters within the plant 100 (such as temperatures, pressures, etc.) and will store this data for future analysis.

While not specifically illustrated in FIG. 1, the data collection system 142 may collect data pertaining to the operating output or load of the plant based on fuel input, load output measurements, etc. and may correlate this data with the operating data collected from the system 100. Moreover, the data collection system 142 may obtain and store data about other variables that affect or form a part of performance or efficiency calculations (e.g. unit heat rate, Q, etc.). The data collection system 142 may also collect data regarding other factors going into or making up a plant performance measure, which factors may include, for example, the amount of particular emissions emanating from the plant as a result of operations at any particular time, the regulatory cost of those emissions at any particular time, the cost of carbon credits needed by the plant based on operation of the plant, equipment degradation and repair costs, the income generated by the production of carbon credits produced in the plant, the price being provided for particular power at particular times, as well as other electrical energy trade market factors like ramp rate, LMP factors, and the costs or income associated with delivering power at contracted power levels and as a result of spot transactions.

The performance monitoring system 140 also includes a performance monitoring engine 144 connected to a user interface 146 which may be located at or as part of, for example, a user workstation associated with the plant. The engine 144, which may be implemented for example in programming executed on a general purpose or a specially designed processor, periodically or at user specified times, obtains the data stored in the database 142 and analyses that data to implement performance monitoring, the results of which may be illustrated to a user via the user interface 146. In particular, the engine 144 performs statistical analysis on the stored data to produce certain types of information for the user to assist the user in viewing and understanding the manner in which the plant is able to operate, for example, from an efficiency standpoint. The statistical information generated by the engine 144 may also enable the user to more effectively modify the operation of the plant to increase the efficiency of the plant, or to at least understand the expected or achievable efficiency of the plant based on actual past performance of the plant.

More particularly, the operation of the performance monitoring engine 144 extends the possibility of performance monitoring in a power plant using a deep statistical analysis of collected process data as well as other efficiency data. Generally speaking, in power generation units equipped with a digital automatic control system, the heat rate calculations are, in practice, engineered to run on-line and can be collected or determined by the engine 144 on a periodic basis. In other words, as a result of the operation of the data collection system 142 in conjunction with the infrastructure already provided by a typical digital control system, a large number of calculation data is available, and this data can be used in a statistical analysis as a valuable tool to determine useful performance monitoring information. In the discussion below, it is assumed that traditional measurement and calculation techniques are implemented to increase the reliability of the collected data, including, for example, assuring the credibility of measurement devices, insuring that the basic measurements (especially flow measurements) operate correctly and are of an appropriate measurement class, insuring that the influence of delayed chemical analysis of fuel (when there are no on-line analyzers) is taken into account, insuring that process data and results are appropriately processed to eliminate measurement errors, etc. This last point may be accomplished, in one example, by filtering out data collected during non-stationary states of the units, etc. However, upon solving these data collection problems, a large, credible base of calculation data and unit heat rate data (or other performance indication data) for different unit operating states of the power plant is obtainable.

Figure 2:
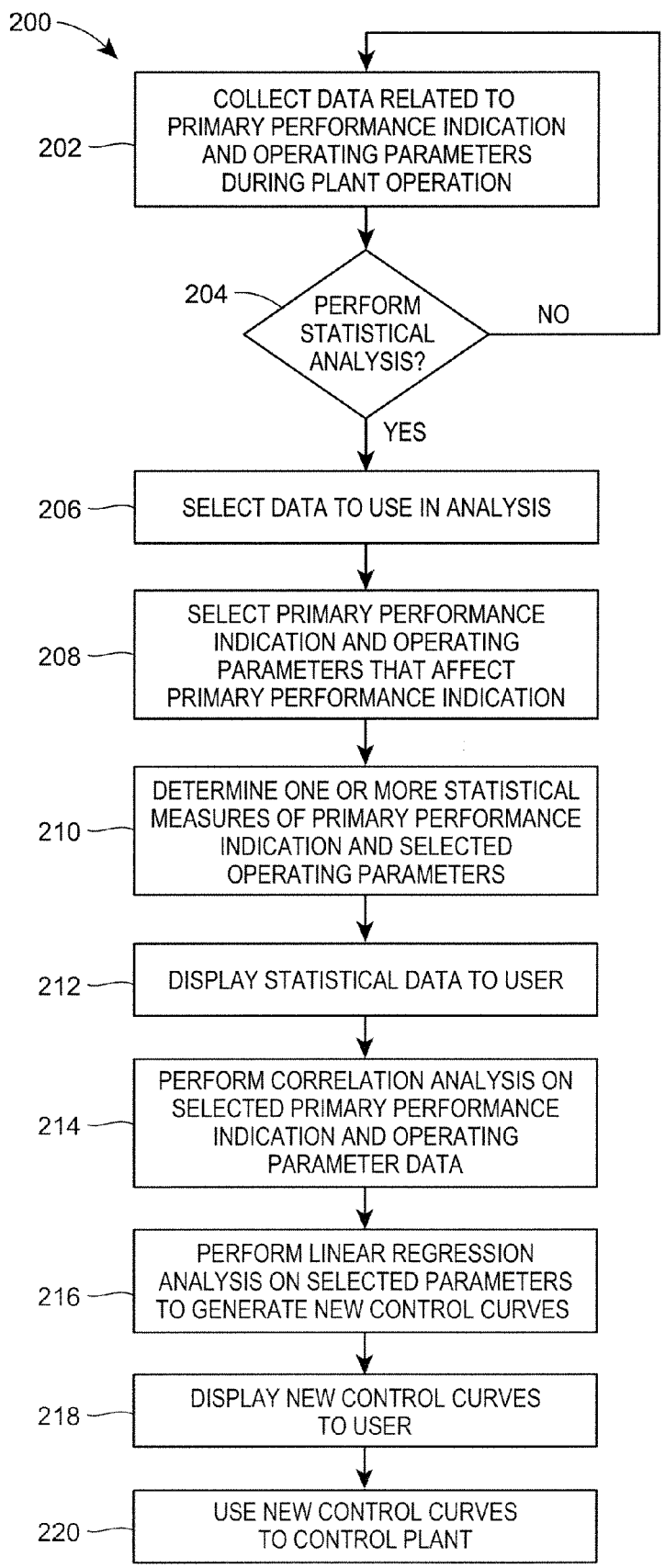
FIG. 2 illustrates a flowchart of a method for performing plant performance monitoring and adjustment using statistical analysis.

FIG. 2 illustrates a flow diagram 200 of a method or a procedure that may be implemented by the performance monitoring system 140 of FIG. 1. At a block 202, the data collection system 142 collects data related to a primary performance indication as well as data related to a number of operating parameters within the power plant that may have an affect on the primary performance indication. The primary performance indication may be, for example, plant efficiency, unit heat rate, etc. and various types of data may be collected to determine this indication including, for example, the costs, amounts and types of fuels being used, the amounts of and the costs associated with release of regulated emissions, carbon credits, costs associated with plant equipment repair and replacement, etc. Additionally, the operating parameters of the power plant may include any measured parameter within the power plant (either Combined Cycle or Conventional Boiler/turbine), including those otherwise listed herein as well as, for example, air heater gas inlet and outlet temperatures, flue gas CO content, flue gas $CO_2$ content, fuel(s) analysis, heating value of fuel(s), fuel cost(s), air heater air inlet/outlet temps, air heater gas inlet/outlet temps, $O_2$ at economizer, $O_2$ after air heaters, primary and/or secondary air flows, cooling water inlet temperature, cooling water outlet temperature, condenser back pressure, makeup water flow, makeup water temperature, condenser hotwell temperature, generator gross power output, generator megavars, hydrogen pressure (if generator is hydrogen cooled), auxiliary power, steam turbine throttle steam temperature/pressure, turbine exhaust pressure/temperature, hot reheat temperature and pressure, IP/LP crossover steam temperature and pressure, for each BFP pump suction and discharge temperature and pressure, water flow through pumps, pump speed, pump motor current, ambient air temperature, ambient relative humidity, ambient barometric pressure, Combustion Turbine Generator (CTG) fuel flow, CTG power, compressor inlet temperature, compressor outlet pressure (CPD), CTG exhaust temperature, chiller inlet temperature, chiller outlet temperature, LP drum temperature, LP blowdown flow, LP drum pressure, LP super heat, outlet steam temperature, LP superheat outlet steam pressure, IP drum temperature, IP blowdown flow, IP drum pressure, IP superheat outlet steam temperature, IP superheat outlet steam pressure, HP drum temperature, HP drum inlet pressure, HP blowdown flow, HP superheat outlet steam pressure, stack gas outlet temperature, cold reheat steam flow, cold reheat steam temperature, cold reheat steam pressure, hot reheat steam flow, hot reheat steam temperature, hot reheat steam pressure, duct burner gas flow, duct burner gas temperature, duct burner gas pressure, compressor ambient air temperature, relative humidity, relative barometric pressure, compressor input flow, compressor inlet temperature, compressor inlet pressure or suction, compressor inlet vane control, compressor intercooling, compressor outlet pressure, compressor outlet temperature, compressor power used, compressor shaft speed, fuel analysis of gas of compressed fluid, boiler heat loss in dry gas, boiler heat loss due to moisture in the fuel, boiler heat loss in the moisture formed from hydrogen, boiler heat loss in the moisture in the supplied air, boiler heat loss due to ash, boiler heat loss due to radiation, boiler heat loss due to carbon monoxide (if CO measured), total boiler heat output, actual boiler efficiency (heat loss), corrected boiler efficiency (heat loss), boiler excess air, air heater air inlet temperature, air heater gas inlet temperature, air heater gas outlet temperature, air heater efficiency, corrected AH flue gas outlet temp with no air leakage, condenser cleanliness and heat transfer, terminal temperature difference, log mean temperature difference, condenser subcooling, circulating water flow, condenser duty, heat transfer coefficient and cleanliness factor, expected condenser back pressure based on clean tubes and deviation from actual measured back pressure, steam turbine generator losses and efficiency, turbine section extraction steam flows, turbine section enthalpies, turbine section efficiencies, turbine section design efficiencies, turbine section efficiencies deviations, etc.

The data collection system 142 may also collect data pertaining to the operating states of the plant (e.g., the power being supplied at any particular time, whether the plant is in start up mode, whether the plant is ramping up or down in output power, the ramp rate, etc.) and this state data may be used to filter the data during statistical analysis. Of course, other type of state data may be collected and used as well or instead of those listed here.

A block 204, which may be implemented in the user interface device 146 (FIG. 1) or in the engine 144 (FIG. 1), determines if enough data has been collected or enough time has elapsed to collect sufficient data on which to perform a statistical analysis. If not, the block 202 continues to collect data. However, if a statistical analysis is to be performed, a block 206 determines which of the collected data (stored within the database 142 of FIG. 1) is to be used in the analysis. The block 206 may, for example, allow a user to specify the times or conditions (e.g., plant states) over which to use data. For example, a user may select all of the data collected over a particular time. However, and much more likely, the user may decide to perform an analysis on data related to a particular operational state of the plant (e.g., when the plant is running at a high power output level such as 160 to 200 MW or at a low power output level such as 120-160 MW), etc.

Next, a block 208, which may also be implemented in the user interface device 146 (FIG. 1) or the engine 144 (FIG. 1) selects or allows a user to select a particular primary performance indication (such as efficiency, unit heat rate, etc.) to be used in the performance monitoring, as well as to select two or more plant operating parameters, the variation of which may have an affect on the primary performance indication. Of course, the primary performance indication may be determined from multiple different types of collected data, including fuel costs, chemical make-up of the fuel, delivered output power from the fuel, and other costs, such as emissions and equipment costs, etc. Of course, any number of operating parameters may be analyzed with respect to the primary performance indication, but it is generally desirable to limit this number to an easily viewable number, to prevent overwhelming the operator or other user with data.

After the time periods (e.g., plant states) associated with the collected data and the type of data to be analyzed have been selected (which selection may occur during set-up of the system and may remain the same thereafter, or may be changed from time to time), a block 210 determines one or more statistical measures of both the primary performance indication and the selected operating parameters. These statistical measures may include means, medians and standard deviations (including first, second, third, etc. standard deviations) associated with the primary performance indication and each of the selected operating parameters.

Figure 3A:
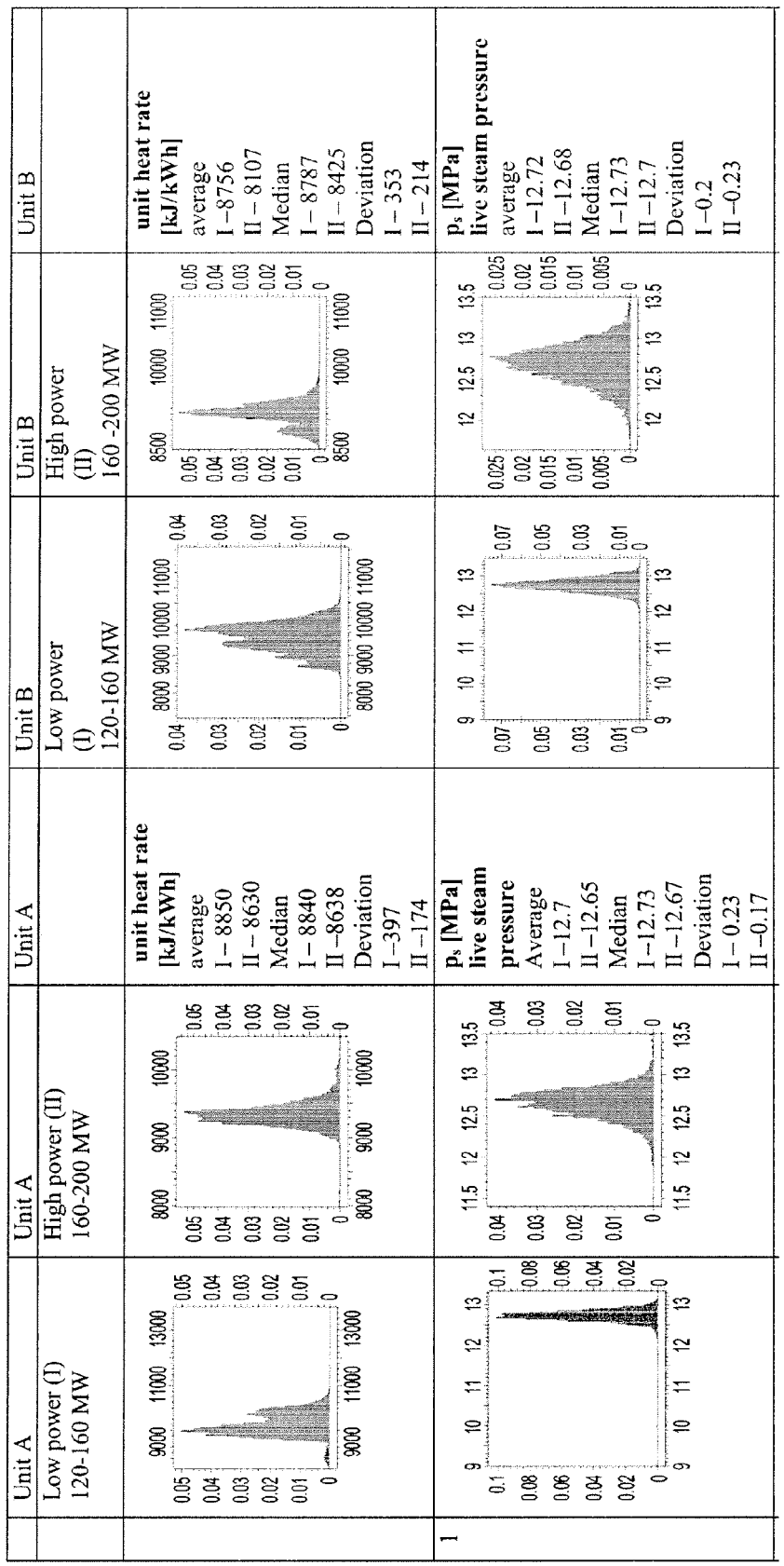
Figure 3B:
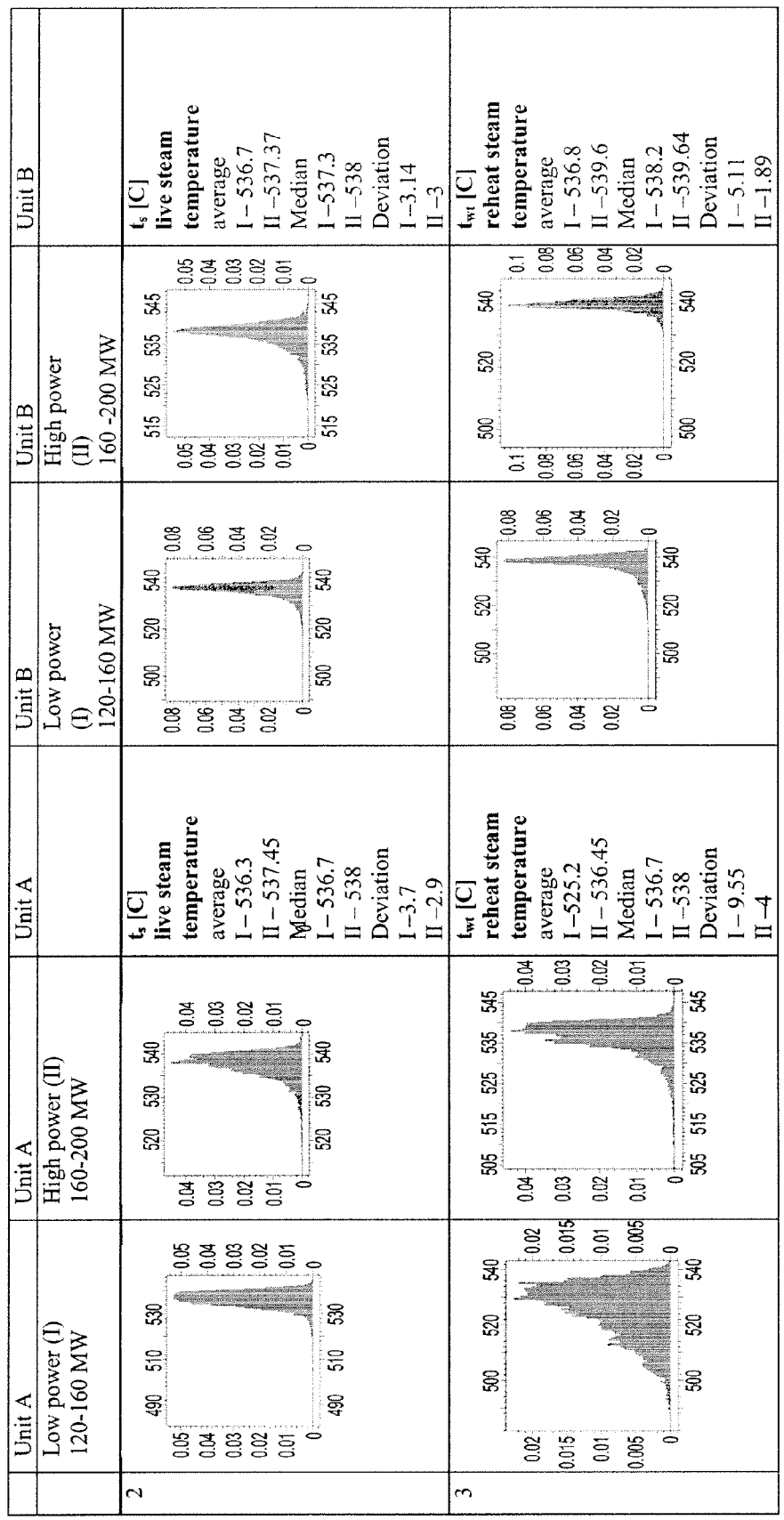
Figure 3C:
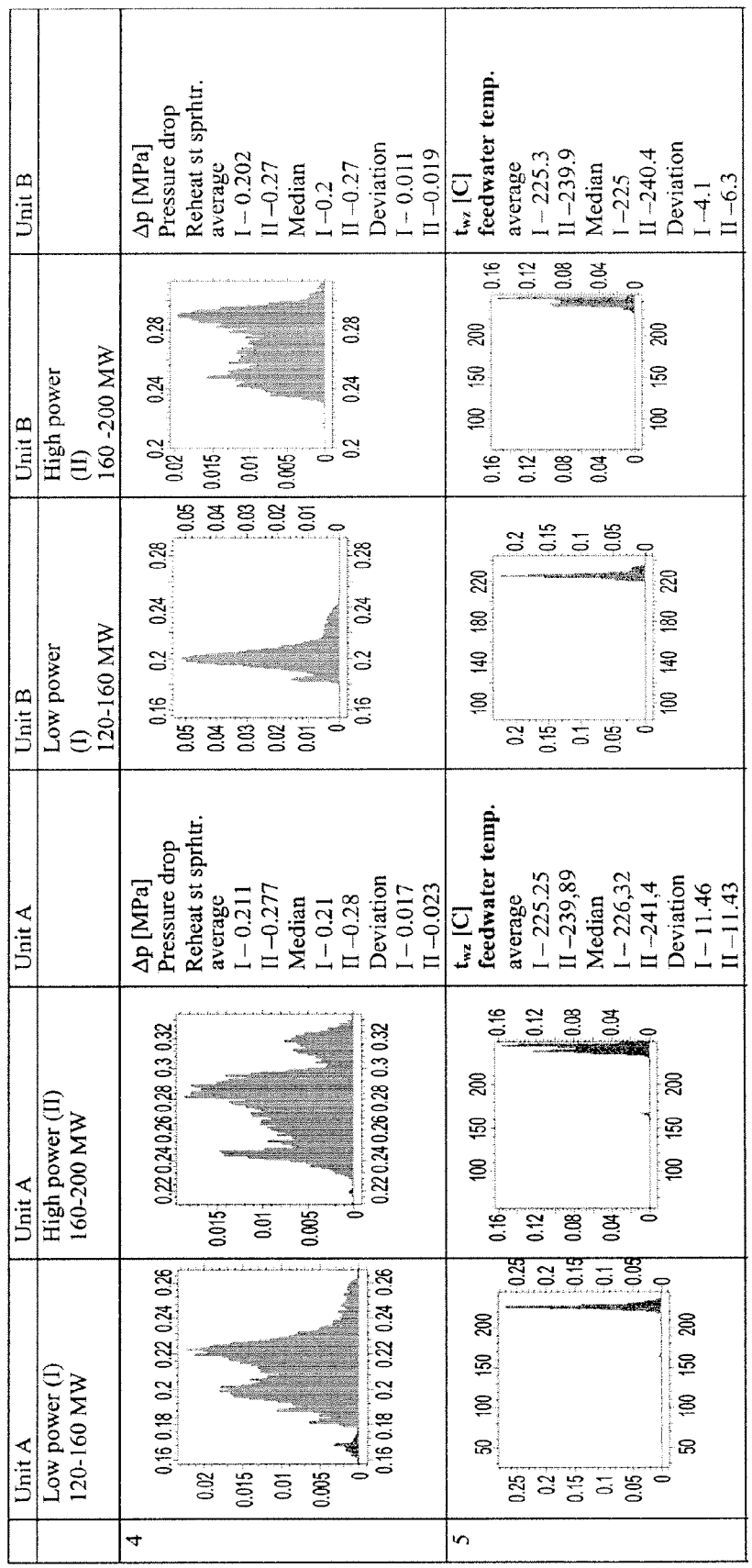
Figure 3E:
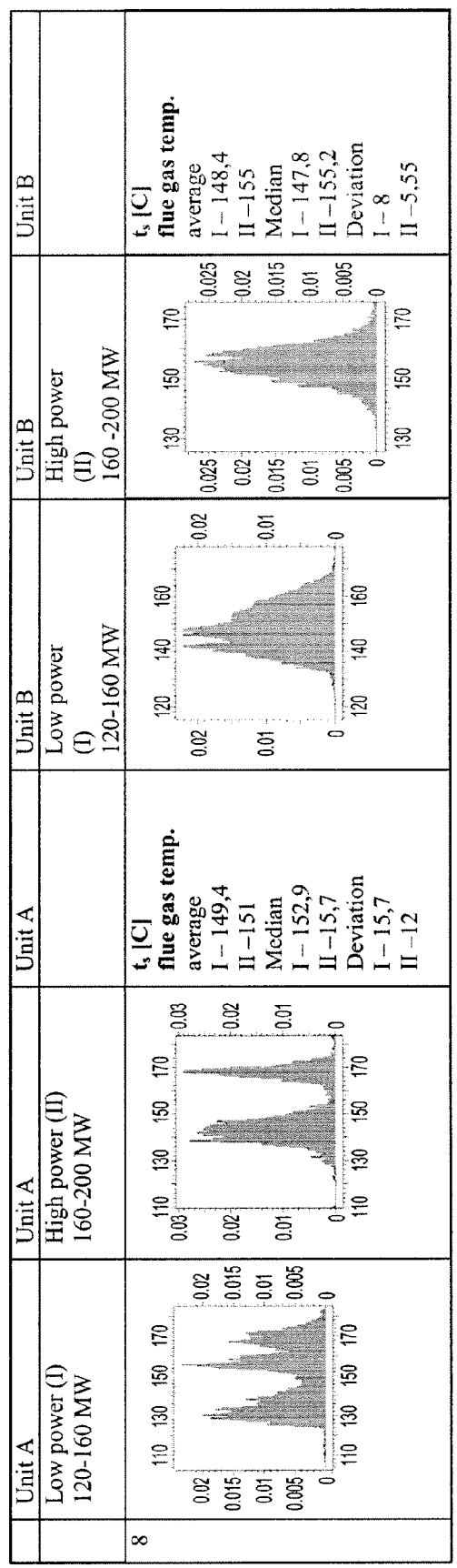

If desired, a block 212 may display the statistical measures to the user in some convenient and easy to understand manner. For example, the block 212 may create a histogram of the data for each of the primary performance indication and each of the selected operating parameters and display these histograms, along with the calculated statistical measures, to a user. FIGS. 3A-3E illustrate one example of a set of graphs that may be generated in this manner. In particular, the graphs of FIGS. 3A-3E were determined for two different power operating regions of two different power plants, plant A and plant B. In this case, the plants A and B had generally the same equipment configuration and thus each should theoretically operate in the same manner. In the case of the graphs of FIGS. 3A-3E, data was collected and analyzed for both of the plants A and B in a lower power output range (120-160 MW) and in a higher power output range (160-200 MW). Here, the left-hand side of the graphs of FIGS. 3A-3E relates to the operation of plant A, with the first column illustrating the low power operation of plant A, the second column illustrating the high power operation of plant A, and the third column illustrating the statistical data (average, mean and standard deviation) for both the low power and the high power operation of plant A. In a similar manner, the right-hand side of the graphs of FIGS. 3A-3E relates to the operation of plant B, with the fourth column (from the left) illustrating the low power operation of plant B, the fifth column illustrating the high power operation of plant B, and the sixth column illustrating the statistical data (average, mean and standard deviation) for both the low power and the high power operation of plant B. Likewise, the first row in FIG. 3A illustrates the histograms and statistical data computed for the primary performance indication (unit heat rate in this case) while each of the other rows of FIGS. 3A-3E illustrates histograms and statistical data for one of eight selected operating parameters which are, in this case, (1) live steam pressure, (2) live steam temperature, (3) reheat steam temperature, (4) pressure drop from the reheat unit to the superheater unit, (5) feedwater temperature, (6) pressure in the condenser, (7) $O_2$ concentration and (8) flue gas temperature.

As illustrated in FIGS. 3A-3E, one of the primary objectives of the statistical analysis may be to create histograms illustrating the operation of the various plant parameters under various different plant conditions (e.g., power output ranges), to determine mean values and standard deviations of the process parameters and to compare these statistical values with current process values. This analysis allows verification of the manner in which the performance parameters (mean and most common values) are compared to reference values (nominal). In large part, due to the operation of current automatic control systems which already collect data about the plant, it is possible to archive data from a practically unlimited period of performance, using a practically unlimited database. Thus, as a result, the statistical analysis can be performed on many different sets of data, over different time periods, and over different plant conditions, such as different power loads. Moreover, when assigning the basic reference operating parameters, the data may be aggregated in unit efficiency data (e.g., steam flow, power). While the calculation examples presented in FIGS. 3A-3E provide results for arbitrarily accepted power ranges of 120-160 MW (low power) and 160-200 MW (high power) corresponding to the typical performance regimes, other ranges could be used instead. Moreover, it is possible to obtain data for each of the primary performance indication and the operating parameters associated with any other plant operational state or plant operating condition, e.g., start up, ramping operation, etc., over any desired time period(s).

Thus, generally speaking, the basic statistical analysis to be performed by the engine 144 to the data collected by the database 142 may be performed by determining statistical measures (descriptive statistics such as means, medians, standard deviations, etc.), histograming the data, and then presenting this data to the user in a meaningful way, such as is illustrated in FIGS. 3A-3E. A user may view this data to look for trends or correlations between the selected operating parameters and the primary performance indication to determine which operating parameter, in reality, has the greatest effect on the primary performance indication. The user may also compare the operation of different plants to one another using this data to determine different operational conditions of different plants. Of course, as is illustrated in FIGS. 3A-3E, this analysis may result in the determination that changes in different operating parameters have different effects on the primary performance indication based on the operating state of the plant (e.g., the power output of the plant) and may differ from plant to plant.

Here it should be noted that the data used in FIGS. 3A-3E was obtained from tests conducted using calculation data of unit heat rate of a set of actual power plants. This analysis was conducted for two similar units, i.e., 225 MW units of identical construction with recent automatic control systems of the same type. Here the data (appropriately averaged and aggregated in appropriate ranges on unit power) was used for the period of around 12 months. From this data and the graphs of FIGS. 3A-3E, it can be observed that even very similar power units have different performance characteristics resulting in different histograms for the basic operating parameters and primary performance indication. Moreover, in many cases, the current process values (obtained during operation) are significantly different than the nominal values (often assumed as referential) and can additionally be significantly different depending on the unit power range. For example, reheat steam temperature for unit A at low loads has the average value of 526 C and very high changeability (standard deviation). Moreover, observing the changeability of a certain parameter (standard deviation) enables a conclusion to be drawn on the level of tuning capable of being performed in the automatic control system.

To enable the user to quantify these correlations in a more meaningful manner, one or more mathematical correlation analyses may be performed on the collected data. In particular, a block 214 of FIG. 2 may perform a correlation analysis, such as a regression analysis, on the primary performance indication and the operating parameter data for a particular operating region of particular plant, to quantitatively determine the manner in which changes in each of the selected or analyzed operating parameters affect the primary performance indication. In one case, the block 214 may implement a principal component analysis (PCA) to determine the manner in which various parameters affect the efficiency or other performance indication.

As is generally known, PCA linearly transforms the collected data by transforming the correlated input variables (i.e., the process parameters) into new variables, the so-called principal components, which are not correlated with one another. This transformation maintains all the most important information concerning the original variables. After performing the PCA, the first PCA component represents the largest effect on the primary performance indication and it is possible to view or analyze the manner in which each of the operating parameters plays into the first principal component (PC1). Thus, a user or the block 214 may analyze the first component of the PCA to identify the process operating parameters with the highest changeability or most effect on the measured performance indication, e.g., efficiency, unit heat rate, etc.

Figure 4:
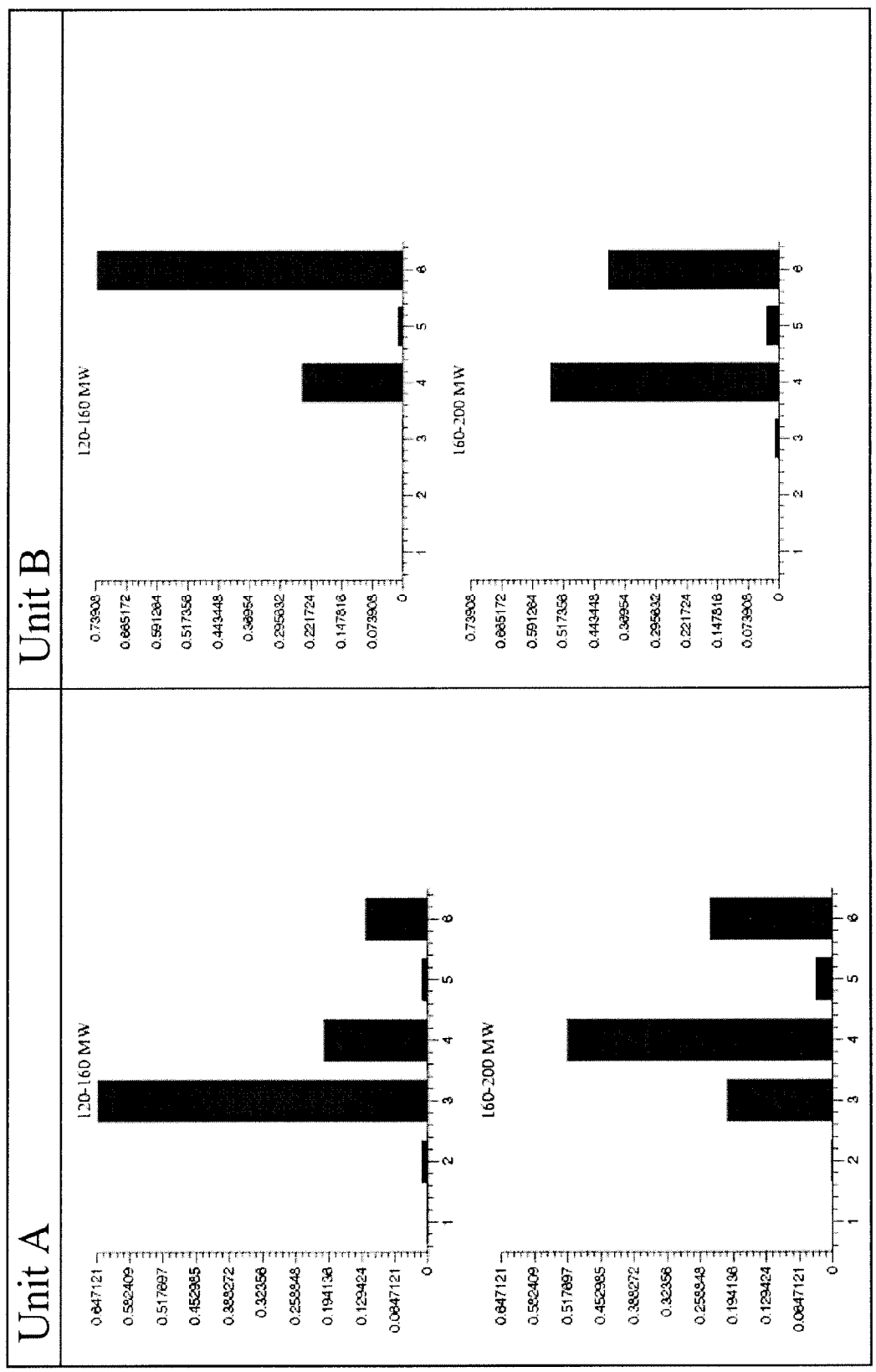
FIG. 4 illustrates a plot of a resulting principal component analysis illustrating the manner in which the plant parameters of FIGS. 3A-3E correlate to the primary performance indication during the different operational states of the different plants.

FIG. 4 depicts an example graph table which illustrates the participation of each of the first six operating parameters of FIGS. 3A-3E on the first principal component generated as a result of a PCA performed on the data of FIGS. 3A-3E. Here, the left-hand side of the table of FIG. 4 illustrates the participation of the first six operating parameters of FIGS. 3A-3E in the first principal component at the low power level (upper left-hand chart) and at the high power level (lower-left hand chart) for plant A. Similarly, the right-hand side of the table of FIG. 4 illustrates the participation of the first six operating parameters in the first principal component (PC1) at the low power level (upper right-hand chart), and at the high power level (lower right-hand chart) for plant B. As can be seen in this example, at the low power level for plant A, the third operating parameter (reheat steam temperature) has the biggest affect on the primary performance indication (unit heat rate), while the fourth operating parameter (reheat to superheater pressure drop) and the sixth operating parameter (pressure in the condenser) have some, but a lot less affect on the unit heat rate. However, in the high power operating range for plant A, the forth operating parameter (reheat to superheater pressure drop) has the largest affect and the sixth operating parameter (pressure in the condenser) has a greater effect than the third operating parameter (reheat steam temperature). In a similar manner, while the fourth and sixth operating parameters have the greatest affect on the unit heat rate in plant B in both the low and high power regions, these vary in magnitude based on the operating range (i.e., the sixth operating parameter has the largest effect in the low power region, while the fourth operating parameter has the largest effect in the high power region).

Thus, as will be understood, the PCA as presented above identifies the process parameters with the highest changeability by transforming the operating parameter data into a set of independent (not correlated) parameters in the form of principal components. As a result, the PCA enables fast identification of the operating parameters that lead to the biggest changes of unit heat rate (or other primary performance indication).

Referring again to FIG. 2, a block 216 may next implement a linear regression model on selected ones of the operating parameters to build an empirical (e.g., linear or non-linear) model of unit heat rate (or other primary performance indication) in the form of a function $f: R^d \rightarrow R$ linearly dependent on the measured parameters and defined by the formula: $f(x) = \langle x, w \rangle - \gamma$, where x is the vector of parameter values, and w, γ are, accordingly, the weight vector and threshold assigned in the basis of empirical data and $\langle .,. \rangle$ is the standard scalable product. A model of this kind makes it possible to assign the direct influence of a given operating parameter over changeability $q_b$ and more precisely, on its empirical model.

The proximal support vector machines approach may be used to assign the optimal vector w and threshold γ. In this approach regressed parameters are assigned by solving the following optimization problem:

$$\min_{w, \gamma, \xi} \frac{1}{2}\|w\|_2^2 + \frac{1}{2}\gamma^2 + \frac{v}{2}\|\xi\|_2^2$$

with constraints $$Xw - e\gamma + \xi = y.$$

A linear regression model constitutes the simplest empirical approximations of unit heat rate from the basic process parameters. It is possible to construct such a model with sufficient accuracy and to then assign the correlation of basic parameters. This operation then leads directly to assigning the influence of these parameters onto the unit heat rate. Of course, the linear regression model can then be modified (using, for example, nonlinear models, neural networks, fuzzy networks, etc.) to improve the mapping accuracy.

Thereafter, the regression data may be used to produce specific curves used to control the various important ones of the operating parameters in a manner that actually increases the performance of the plant in an achievable manner, because this methodology is based on the previously measured operation of the actual plant being controlled or altered. For example, an approximation $q_b$ may be obtained using linear regression. This method of analysis is an empirical (based on historical data) model approximation (prediction) of the unit heat rate. Although the obtained results indicate the possibility of only very rough estimation $q_b$, the model correlation is much higher than the correlation of a single variable. The correlations of basic parameters allow an evaluation the influence of a given parameter on $q_b$. Such a correlation is illustrated in FIG. 5 for reheat steam temperature at both the high power level and the low power level for plant A.

Figure 5:
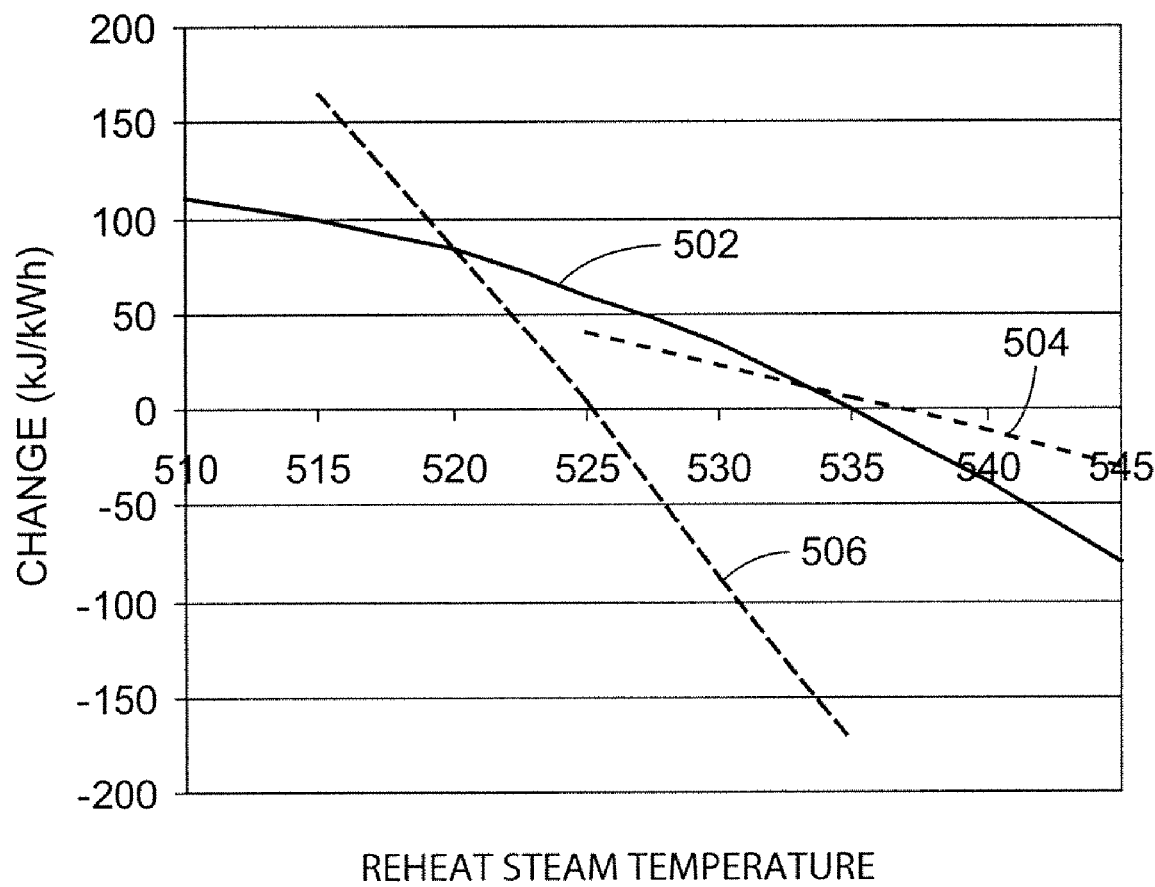
FIG. 5 illustrates a correction curve generated for a particular operating parameter as related to a primary performance indication using collected data from a power plant.

The chart of FIG. 5, which was generated using the regression analysis discussed above on the data of plant A illustrated in FIGS. 3A-3E confirms the conclusions generated from the statistical analysis. In particular, the correlation of the process variables to the unit heat rate at high power levels illustrates that none of the process parameters is individually responsible for a strong change of $q_b$. However, at a low power level, there is a visible dominant influence of reheat steam temperature, which largely reduces the unit performance. Linear regression leads directly to obtaining the linear dependence of influence of a given parameter to a change of correlation of unit heat rate. These values are then compared with the data from the manufacturer's correction curve obtaining the final dependencies shown in FIG. 5. In FIG. 5, the line 502 illustrates the OEM (factory) correction curve, the line 504 illustrates the appropriate values from linear regression for the high power region and the line 506 illustrates appropriate values from linear regression for the low power region. Comparing the data in the diagram shows that using correction curves is highly questionable in many cases.

Once the newly created control or correction curves, such as the curves 504 and 506 of FIG. 5, are created for a particular operating parameter, these curves may be displayed to a user by, for example, a block 218 of FIG. 2. The user may then use these curves, instead of the manufacturer's curves to perform monitoring of the plant. Likewise, a control routine or a user, at a block 220 of FIG. 2, may use the new control or correction curves to perform control within the plant. This type of control may enable the user or a control system to ignore or relax previously set limits on certain operating parameters (such as those found in the PCA analysis to have little affect on the primary performance indication) to perform tighter or less relaxed control on other most dominant operating parameters (such as those found in the PCA analysis to have a high level of affect on the primary performance indication). Of course this control may be based on and tailored to the current operating region or state of the plant, and thus may differ based on whether the plant is operating at a high or a low output power, is ramping up or down in power output, etc.

Still further, subsequent control activities can be implemented with the goal of changing the measured statistical values determined for one or more operating parameters in the future. For example, subsequent control can be implemented to move the average or the median of the measured values for a particular operating parameter (e.g., the reheat temperature, etc.) to some other desired value, to reduce (or increase) the first, second, third, etc. standard deviation of the value of the operating parameter over a particular period of time, etc. In other words, the collected statistical data can be used to develop one or more statistically-based goals to be implemented with respect to controlling a particular operating parameter during subsequent control of the power plant, to provide for better or more optimal operation of the power plant in the future. These goals need not be static setpoints, as is typically the case in control, but can be related to obtaining desired statistical value(s) for particular operating parameter(s) during subsequent operation of the power plant. In this manner, the operation of the power plant over a period of time is controlled to result in a specified operating parameter having one or more of a desired mean, median, standard deviation, etc. during the future period of time. Using this technique, the control system can allow for or provide looser control over an operating parameter by allowing the operating parameter to vary, while still having tight control over the ultimate operation of the plant by controlling the statistical manner in which the parameter varies (e.g. by controlling the operating parameter so that one or more of the mean, median, standard deviation, etc. of the operating parameter reaches particular value(s) or range of values during some specified period of time). Thus, this control could be implemented to result in obtaining a particular statistical value (such to obtain a particular mean value) or to result in operation within a range of statistical values (such as operation to result in a mean value of the operating parameter falling within a desired range of mean values).

Thus, as will be understood, the method of data analysis described herein enables a new method of implementing performance based control. For example, the data analysis presented above indicates that, for the tested case in plant A, it is necessary to pay attention to the problem of insufficient heating of steam temperature at low power levels, as changing this variable or controlling this variable tightly results in the greatest change in the primary performance indication (i.e., unit heat rate in this example). Of course, a more detailed analysis may be performed using this method by performing calculations for more narrow power ranges, which can result in even more specific conclusions.

Still further, while the performance monitoring analysis has been described herein for use in comparing or determining the relative affect of various different sub-units (e.g., boilers, reheaters, superheaters, sprayers, etc.) within a power plant on the overall efficiency of the power plant, the same analysis could be applied on a smaller scale within the plant. For example, data pertaining to a performance indication and data pertaining to operating parameters of associated with a particular sub-unit within the plant, such as the reheater unit, the boiler, the soot blowers, etc., could be collected and analyzed and used to control the operation of the sub-unit in the same manner as described above, to thereby enhance the operation of the particular sub-unit, irrespective of other sub-units within the power plant.

Thus, as described above, it is believed that the calculations used by current performance monitoring methods have exceeded their limits. Instead, as discussed herein, modern performance control, having tools in the form of constant efficiency calculations and automatic control systems, when integrated with archive systems and statistical data analysis, enables a far more detailed and precise analysis into the reasons for a reduction in efficiency in a particular plant. What seems particularly questionable is continued use and application of OEM generated correction curves. Instead, the performance monitoring modification can be performed by applying statistical analysis in a large scope to obtain reasons and recommendations as to changes to be implemented during the operation of a plant to increase, for example, plant efficiency. Moreover, these performance monitoring methods can be connected with the evaluation of other variable costs (emission, energy trade, repairs, etc.) for a full market evaluation, instead of being limited to unit heat rate.

While the performance monitoring scheme described herein is described in conjunction with steam generating power systems, it is applicable to other types of power plants, including for example, combined cycle plants, combined power and heating plants and power plants that have different configurations for superheater and reheater sections than illustrated or described herein or that use other technology for generating power.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of monitoring the performance of a power generating unit, comprising:
   collecting first data related to a primary performance indication for the power generating unit at numerous different times within a time period during which the power generating unit is operating, the first data including data corresponding to at least one cost in addition to a cost of fuel;
   determining the primary performance indication based on the collected first data;
   collecting second data related to each of a plurality of operating parameters of the power generating unit within the time period;
   performing a correlation analysis on the first data and the second data to quantitatively determine, for each of the plurality of operating parameters, a correlation between the each of the plurality of operating parameters and the primary performance indication;
   determining from the correlation analysis a subset of the plurality of operating parameters that most affect the primary performance indication for the power generating unit; and
   altering the control of one or more of the subset of the plurality of operating parameters during subsequent operation of the power generating unit based on the correlation analysis to thereby enhance the primary performance indication during subsequent operation of the power generation unit.

2. The method of claim 1, wherein performing the correlation analysis includes performing a principal component analysis to produce a first principal component.

3. The method of claim 2, wherein determining from the correlation analysis the subset of the plurality of operating parameters that most affect the primary performance indication for the power generating unit includes analyzing the participation in the first principal component of the each of the plurality of operating parameters, and defining one or more operating parameters that have the greatest participation in the first principal component as the subset of the plurality of operating parameters.

4. The method of claim 1, further including performing a regression analysis on at least one of the subset of the plurality of operating parameters.

5. The method of claim 4, wherein altering the control of the one or more of the subset of the plurality of operating parameters during subsequent operation of the power generating unit includes using the regression analysis to alter the control of the at least one of the subset of the plurality of operating parameters.

6. The method of claim 1, wherein the primary performance indication is efficiency.

7. The method of claim 1, wherein altering the control of the one or more operating parameters during subsequent operation of the power generating unit based on correlation analysis includes determining another one of the operating parameters that is not highly correlated to the primary performance indication, and relaxing the control of the another one of the operating parameters to accommodate the altering the control of the one or more of the subset of the plurality of operating parameters.

8. The method of claim 1, further including, for the each of the plurality of operating parameters, determining one or more statistical measures associated with both the primary performance indication and the each of the plurality of operating parameters.

9. The method of claim 8, wherein the one or more statistical measures includes one of an average, a median, or a standard deviation.

10. The method of claim 8, further including displaying the one or more statistical measures.

11. The method of claim 10, further including displaying, for the each of the plurality of operating parameters, a histogram of data corresponding to the primary performance indication and the each of the plurality of operating parameters in conjunction with the display of the one or more statistical measures.

12. The method of claim 1,
further including selecting a subset of the collected the first data for the primary performance indication as the performance indication data, and selecting a subset of the collected second data for the each of the plurality of operating parameters as the operating parameter data; and
wherein performing the correlation analysis on the first data and the second data comprises performing a correlation analysis on the subset of the first data and the subset of the second data.

13. The method of claim 1, wherein collecting the second data comprises collecting data pertaining to an operating state corresponding to one of: (1) an output power generated by the power generating unit, (2) whether the power generating unit is in a startup mode, or (3) whether the output power being generated by the power generating unit is changing or is stable.

14. The method of claim 1, wherein altering the control of one or more of the subset of the plurality of operating parameters during subsequent operation of the power generating unit includes controlling the subsequent operation of the power generating unit to result in a particular statistical measure for one of the subset of the plurality of operating parameters during subsequent operation of the power generating unit.

15. The method of claim 14, wherein controlling the subsequent operation of the power generating unit to result in a particular statistical measure for one of the subset of the plurality of operating parameters during subsequent operation of the power generating unit includes controlling the subsequent operation of the power generating unit to result in one or more of (1) measured values of the one of the subset of the plurality of operating parameters resulting in a desired mean value or in a mean value within a desired range of mean values, (2) the measured values of the one of the subset of the plurality of operating parameters resulting in a desired median value or a median value within a desired range of median values, or (3) the measured values of the one of the subset of the plurality of operating parameters resulting in desired standard deviation value or a standard deviation within a desired range of standard deviation values.

16. The method of claim 1, wherein the at least one cost in addition to the cost of fuel includes at least one of: an environmental credit, a cost of equipment degradation, a cost of equipment repair, or an electrical energy trade market factor.

17. A method of monitoring the performance of a power generating unit, comprising:
collecting first data related to a primary performance indication for the power generating unit at numerous different times within a time period, the first data including data corresponding to at least one cost in addition to a cost of fuel;
determining the primary performance indication based on the collected first data;
collecting second data related to each of a plurality operating parameters of the power generating unit within the time period;
determining, based on the first data and the second data, one or more statistical measures associated with both the primary performance indication and at least one of the plurality of operating parameters; and
controlling the power generating unit over a period of time to result in a desired value or desired range of values of at least one of the one or more statistical measures.

18. The method of claim 17, wherein the one or more statistical measures includes more than one of an average, a median, or a standard deviation.

19. The method of claim 17, further comprising displaying the one or more statistical measures, including displaying a histogram of data corresponding to the primary performance indication and the at least one of the plurality of operating parameters.

20. The method of claim 17, further including:
performing a correlation analysis on the first data and the second data to determine, for the each of the plurality of operating parameters, a correlation between the each of the plurality of operating parameters and the primary performance indication, and
displaying results of the correlation analysis.

21. The method of claim 20, wherein performing the correlation analysis includes performing a principal component analysis to produce a first principal component.

22. The method of claim 21, further includes analyzing the participation in the first principal component of the each of the plurality of operating parameters, and indicating one or more of the plurality of operating parameters that has the greatest participation in the first principal component.

23. The method of claim 22, further including performing a regression analysis on at least one of the indicated operating parameters that has the greatest participation in the first principal component.

24. The method of claim 17,
further including selecting, based on an operating state of the power generation unit, a subset of the first data and selecting, based on the operating state of the power generation unit, a subset of the second data data; and
wherein determining, based on the first data and the second data, the one or more statistical measures comprises determining one or more statistical measures based on the subset of the first data and the subset of the second data.

25. The method of claim 17, further including controlling one of the plurality of operating parameters during subsequent operation of the power generating unit to result in a particular statistical measure for the one of the plurality of operating parameters during subsequent operation of the power generating unit.

26. The method of claim 25, wherein controlling one of the plurality of operating parameters includes controlling the subsequent operation of the power generating unit to result in one or more of (1) measured values of the one of the plurality of operating parameters resulting in a desired mean value or in a mean value within a desired range of mean values, (2) the measured values of the one of the plurality of operating parameters resulting in a desired median value or a median value within a desired range of median values, or (3) the measured values of the one of the plurality of operating parameters resulting in desired standard deviation value or a standard deviation within a desired range of standard deviation values.

27. A system for monitoring the performance of a power generating unit, comprising:
a computer readable memory; and
a computer program stored on the computer readable memory and executable on one or more processors to:
collect first data related to a primary performance indication for the power generating unit at numerous different times within a time period, the first data including data corresponding to at least one cost in addition to a cost of fuel,
determine the primary performance indication based on the collected first data,
collect second data related to each of a plurality operating parameters of the power generating unit within the time period,
perform a correlation analysis on the first data and the second data to quantitatively determine, for the each of the plurality of operating parameters, a correlation between the each of the plurality of operating parameters and the primary performance indication, and
determine from the correlation analysis a subset of the plurality of operating parameters that most affect the primary performance indication for the power generating unit, wherein each member of the subset of the plurality of operating parameters effects a bigger change in the primary performance indication than at least one other operating parameter of the plurality of operating parameters that is not a member of the subset.

28. The system for monitoring the performance of a power generating unit of claim 27, wherein the computer program is further executable on one or more processors to alter the control of one or more of the subset of the plurality of operating parameters during subsequent operation of the power generating unit based on the correlation analysis to thereby enhance the primary performance indication during the subsequent operation of the power generation unit.

29. The system for monitoring the performance of a power generating unit of claim 28, wherein the computer program alters the control of one or more of the subset of the plurality of operating parameters during subsequent operation of the power generating unit by controlling the subsequent operation of the power generating unit to result in a particular statistical measure for one of the subset of the plurality of operating parameters during subsequent operation of the power generating unit.

30. The system for monitoring the performance of a power generating unit of claim 29, wherein the computer program controls the subsequent operation of the power generating unit to result in one or more of (1) measured values of the one of the subset of the plurality of operating parameters resulting in a desired mean value or in a mean value within a desired range of mean values, (2) the measured values of the one of the subset of the plurality of operating parameters resulting in a desired median value or a median value within a desired range of median values, or (3) the measured values of the one of the subset of the plurality of operating parameters resulting in desired standard deviation value or a standard deviation within a desired range of standard deviation values.

31. The system for monitoring the performance of a power generating unit of claim 27, wherein the computer program performs the correlation analysis by performing a principal component analysis to produce a first principal component.

32. The system for monitoring the performance of a power generating unit of claim 31, wherein the computer program determines from the correlation analysis, a subset of the plurality of operating parameters that most affect the primary performance indication for the power generating unit by analyzing the participation in the first principal component of the each of the plurality of operating parameters, and defining the one or more operating parameters that have the greatest participation in the first principal component as the subset of the plurality of operating parameters.

33. The system for monitoring the performance of a power generating unit of claim 32, wherein the computer program performs a regression analysis on at least one of the subset of the plurality of operating parameters.

34. The system for monitoring the performance of a power generating unit of claim 33, wherein the computer program is further executable on one or more processors to alter the control of one or more of the subset of the plurality of operating parameters during subsequent operation of the power generating unit based on the correlation analysis to thereby enhance the primary performance indication during the subsequent operation of the power generation unit, and wherein altering the control of one or more of the subset of the plurality of operating parameters during the subsequent operation of the power generating unit includes using the regression analysis to alter the control of the at least one of the subset of the plurality of operating parameters.

35. The system for monitoring the performance of a power generating unit of claim 27, wherein the computer program is further executable on one or more processors to determine one or more statistical measures associated with each of the primary performance indication and the each of the plurality of operating parameters, and to display the one or more statistical measures for the each of the primary performance indication and the each of the plurality of operating parameters.

36. The system for monitoring the performance of a power generating unit of claim 35, wherein the computer program is further executable to create and display a histogram of data for the each of the primary performance indication and the each of the plurality of operating parameters, in conjunction with the display of the one or more statistical measures for the each of the primary performance indication and the each of the plurality of operating parameters.

37. The system for monitoring the performance of a power generating unit of claim 27, wherein the computer program is further executable to:
select, based on an operating state of the power generation unit, a subset of the first data;
select, based on the operating state of the power generation unit, a subset of the second data; and
perform the correlation analysis on the subset of the first data and the subset of the second data.

38. The system for monitoring the performance of a power generating unit of claim 37, wherein the computer program is further executable to define the operating state as one of: (1) an output power generated by the power generating unit, (2) whether the power generating unit is in a startup mode, or (3) whether the output power being generated by the power generating unit is changing or is stable.

* * * * *

UNITED STATES PATENT AND TRADEMARK OFFICE
CERTIFICATE OF CORRECTION

PATENT NO. : 8,200,369 B2
APPLICATION NO. : 12/047217
DATED : June 12, 2012
INVENTOR(S) : Xu Cheng et al.

Page 1 of 1

It is certified that error appears in the above-identified patent and that said Letters Patent is hereby corrected as shown below:

In the Claims:

At Column 18, lines 16-17, "parameters; and controlling" should be -- parameters;
performing a correlation analysis on the first data and the second data to determine, for each of the plurality of operating parameters, a correlation between the each of the plurality of operating parameters and the primary performance indication; and
controlling --.

At Column 18, lines 28-34, "including: performing a correlation analysis on the first data and the second data to determine, for the each of the plurality of operating parameters, a correlation between the each of the plurality of operating parameters and the primary performance indication, and displaying" should be -- including
displaying --.

At Column 18, line 51, "data data" should be -- data --.

Signed and Sealed this
Twenty-ninth Day of April, 2014

Michelle K. Lee
*Deputy Director of the United States Patent and Trademark Office*